United States Patent
Han et al.

(10) Patent No.: US 10,471,847 B1
(45) Date of Patent: Nov. 12, 2019

(54) MULTI-PARTICLE REDUCED ORDER LI-ION BATTERY CONTROLLER

(71) Applicant: SF Motors, Inc., Santa Clara, CA (US)

(72) Inventors: Sangwoo Han, Santa Clara, CA (US); Saeed Khaleghi Rahimian, Santa Clara, CA (US); Ying Liu, Santa Clara, CA (US); Yifan Tang, Santa Clara, CA (US)

(73) Assignee: SF Motors, Inc., Santa Clara, CA (US)

( * ) Notice: Subject to any disclaimer, the term of this patent is extended or adjusted under 35 U.S.C. 154(b) by 0 days.

(21) Appl. No.: 16/245,896

(22) Filed: Jan. 11, 2019

Related U.S. Application Data

(60) Provisional application No. 62/780,133, filed on Dec. 14, 2018.

(51) Int. Cl.
 *B60L 58/00* (2019.01)
 *B60L 58/12* (2019.01)
 *B60L 58/25* (2019.01)
 *B60W 20/00* (2016.01)

(52) U.S. Cl.
 CPC .............. *B60L 58/12* (2019.02); *B60L 58/25* (2019.02); *B60W 20/00* (2013.01); *B60W 2710/242* (2013.01); *B60Y 2200/91* (2013.01); *B60Y 2200/92* (2013.01)

(58) Field of Classification Search
 USPC .......................................................... 701/22
 See application file for complete search history.

(56) References Cited

U.S. PATENT DOCUMENTS

| | | | | |
|---|---|---|---|---|
| 2010/0033132 | A1* | 2/2010 | Nishi ..................... | B60K 6/365 |
| | | | | 320/136 |
| 2013/0307489 | A1* | 11/2013 | Kusch ..................... | B60L 58/26 |
| | | | | 320/162 |

(Continued)

OTHER PUBLICATIONS

Li et al., A simplified multi-particle model for lithium ion batteries via a predictor-corrector strategy and quasi-linearization, 2016, Elsevier, Energy, pp. 154-169. (Year: 2016).*

(Continued)

*Primary Examiner* — James M McPherson
(74) *Attorney, Agent, or Firm* — Foley & Lardner LLP; James De Vellis

(57) ABSTRACT

A battery management system that uses a multiple particle reduced order model to manage battery performance of a vehicle, such as an electric vehicle or hybrid electric vehicle is provided. The system can receive a value of a current output and determine, via a multi-particle model, a local current distribution that converges. The system can determine, via the multi-particle model and subsequent to determination of the local current distribution that converges, a concentration distribution. The system can determine, based on the local current distribution, a value of a voltage of the battery. The system can determine, based on the value of the voltage of the battery and the concentration distribution, a temperature of the battery. The system can generate, based on the value of the voltage of the battery or the temperature of the battery, a command to manage a performance of the battery.

19 Claims, 6 Drawing Sheets

(56) References Cited

U.S. PATENT DOCUMENTS

| | | | | |
|---|---|---|---|---|
| 2013/0314094 | A1* | 11/2013 | Farmer | G01N 25/20 324/430 |
| 2015/0197159 | A1* | 7/2015 | Lee | B60L 11/1851 701/22 |
| 2015/0268285 | A1* | 9/2015 | Loftus | G01R 31/007 324/503 |
| 2016/0016482 | A1* | 1/2016 | Lee | G01R 31/389 701/22 |
| 2016/0023566 | A1* | 1/2016 | Lee | B60L 11/1851 429/50 |
| 2016/0023567 | A1* | 1/2016 | Lee | B60L 11/1861 320/136 |
| 2016/0023568 | A1* | 1/2016 | Lee | B60L 58/12 429/50 |
| 2016/0023569 | A1* | 1/2016 | Lee | B60L 11/1861 429/50 |
| 2016/0245871 | A1* | 8/2016 | Joe | H01M 10/48 |
| 2016/0252583 | A1* | 9/2016 | Joe | G01R 31/3842 702/63 |
| 2017/0113565 | A1* | 4/2017 | Lin | B60L 3/0046 |
| 2017/0288414 | A1* | 10/2017 | Klein | B60L 58/16 |
| 2018/0086222 | A1* | 3/2018 | Juang | B60L 58/12 |
| 2018/0198300 | A1* | 7/2018 | Howey | B60L 58/12 |
| 2018/0313905 | A1* | 11/2018 | Takahashi | G01R 31/367 |
| 2019/0025379 | A1* | 1/2019 | Pajovic | B60L 58/12 |
| 2019/0041464 | A1* | 2/2019 | Chow | G01R 31/3648 |

OTHER PUBLICATIONS

Majdabadi et al., Simplified electrochemical multi-particle model for LiFePO4 cathodes in lithium-ion batteries, 2015, Elsevier, Energy, pp. 633-643. (Year: 2015).*

D. D. Domenico, A. Stefanopoulou, G. Fiengo, "Lithium-Ion Battery State of Charge and Critical Surface Charge Estimation Using an Electrochemical Model-Based Extended Kalman-Filter," J. Dynamic Systems, Measurement, and Control 132 (6) 2010, 061302.

K. D. Stetzel, L. L. Aldrich, M. S. Trimboli, G. L. Plett, "Electrochemical State and Internal Variables Estimation Using a Reduced-Order Physics-Based Model of a Lithium-ion Cell and an Extended Kalman Filter," J. Power Sources 278 (2015) 490-505.

Kim et al. "Efficient and Extensible Quasi-Explicit Modular Nonlinear Multiscale Battery Model: GH-MSMD", Journal of The Electrochemical Society, 164 (6), Sep. 30, 2016, pp. A1076-A1088.

Li et al. "A single particle model with chemical/mechanical degradation physics for lithium ion battery State of Health (SOH) estimation", Applied Energy 212 (2018), Jul. 23, 2017, pp. 1178-1190.

Smith et al. "Model-Based Electrochemical Estimation of Lithium-Ion Batteries", 17th IEEE International Conference on Control Applications, Sep. 2008, pp. 714-719.

* cited by examiner

MULTI-PARTICLE REDUCED ORDER LI-ION BATTERY CONTROLLER

CROSS-REFERENCES TO RELATED APPLICATIONS

This application claims the benefit of priority under 35 U.S.C. § 119 to U.S. Provisional Patent Application No. 62/780,133, filed Dec. 14, 2018, which is hereby incorporated by reference herein in its entirety.

BACKGROUND

Vehicles such as automobiles can include batteries that provide power to components of the vehicle. The amount of power or the duration of power supplied by the battery can vary.

SUMMARY

The present disclosure is directed to systems and methods of managing battery performance of a vehicle, such as an electric vehicle or hybrid electric and gas vehicle.

At least one aspect is directed to a system to manage battery performance of a vehicle. The system can include a battery management system of the vehicle comprising one or more processors and memory. The vehicle can include a sensor and a battery. The battery management system can include a database, a charge conservation component, a reaction kinetics component, a mass conservation component, and a battery controller. The database can store a profile for the battery of the vehicle. The sensor can identify a value of a current output by the battery that supplies power to the vehicle. The value of the current output by the battery can correspond to a first timestamp. The charge conservation component and the reaction kinetics component can determine, via a multi-particle model, a local current distribution that converges. The mass conservation component can determine, via the multi-particle model and subsequent to determination of the local current distribution that converges, a concentration distribution. The battery controller component can determine, based on the local current distribution, a value of a voltage of the battery. The battery controller component can determine, based on the value of the voltage of the battery and the concentration distribution, a temperature of the battery. The battery controller component can generate, based on the value of the voltage of the battery or the temperature of the battery, a command to manage a performance of the battery.

At least one aspect is directed to a method of managing battery performance of a vehicle. The method can include a battery management system of the vehicle receiving a value of a current output by a battery of the vehicle that supplies power to the vehicle. The value of the current output by the battery can correspond to a first timestamp. The method can include the battery management system determining, via a multi-particle model, a local current distribution that converges. The method can include the battery management system determining, via the multi-particle model and subsequent to determination of the local current distribution that converges, a concentration distribution. The method can include the battery management system identifying, based on the local current distribution, a value of a voltage of the battery. The method can include the battery management system determining, based on the value of the voltage of the battery and the concentration distribution, a temperature of the battery. The method can include the battery management system generating, based on the value of the voltage of the battery or the temperature of the battery, a command to manage a performance of the battery.

At least one aspect is directed to a system to manage battery performance of a vehicle. The system can use a multi-particle reduced order Li-ion battery model. The system can include a battery management system. The battery management system can include one or more processors and memory. The system can include a database. The database can store a profile for a battery. A sensor of the vehicle can identify a value of a current output by the battery that supplies power to the vehicle. A charge conservation component of the battery management system can determine, via a multi-particle model, a first value. A reaction kinetics component of the battery management system can determine, via the multi-particle model, a second value. A mass conservation component of the battery management system can determine, via the multi-particle model and subsequent to determination of the first value and the second value, a third value. A battery controller component of the battery management system can determine, based on the first value, the second value, and the third value, a value of a voltage of the battery or a value of a heat generation rate of the battery, and generate, based on the value of the voltage of the battery or the value of the heat generation rate of the battery, a command to manage a performance of the battery.

At least one aspect is directed to a method of managing battery performance of a vehicle. The method can include a battery management system identifying a value of a current output by the battery that supplies power to the vehicle. The method can include a charge conservation component of the battery management system determining, via a multi-particle model, a first value. The method can include a reaction kinetics component of the battery management system determining, via the multi-particle model, a second value. The method can include a mass conservation component of the battery management system determining, via the multi-particle model and subsequent to determination of the first value and the second value, a third value. The method can include a battery controller component of the battery management system determining, based on the first value, the second value, and the third value, a value of a voltage of the battery or a value of a heat generation rate of the battery, and generating, based on the value of the voltage of the battery or the value of the heat generation rate of the battery, a command to manage a performance of the battery.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
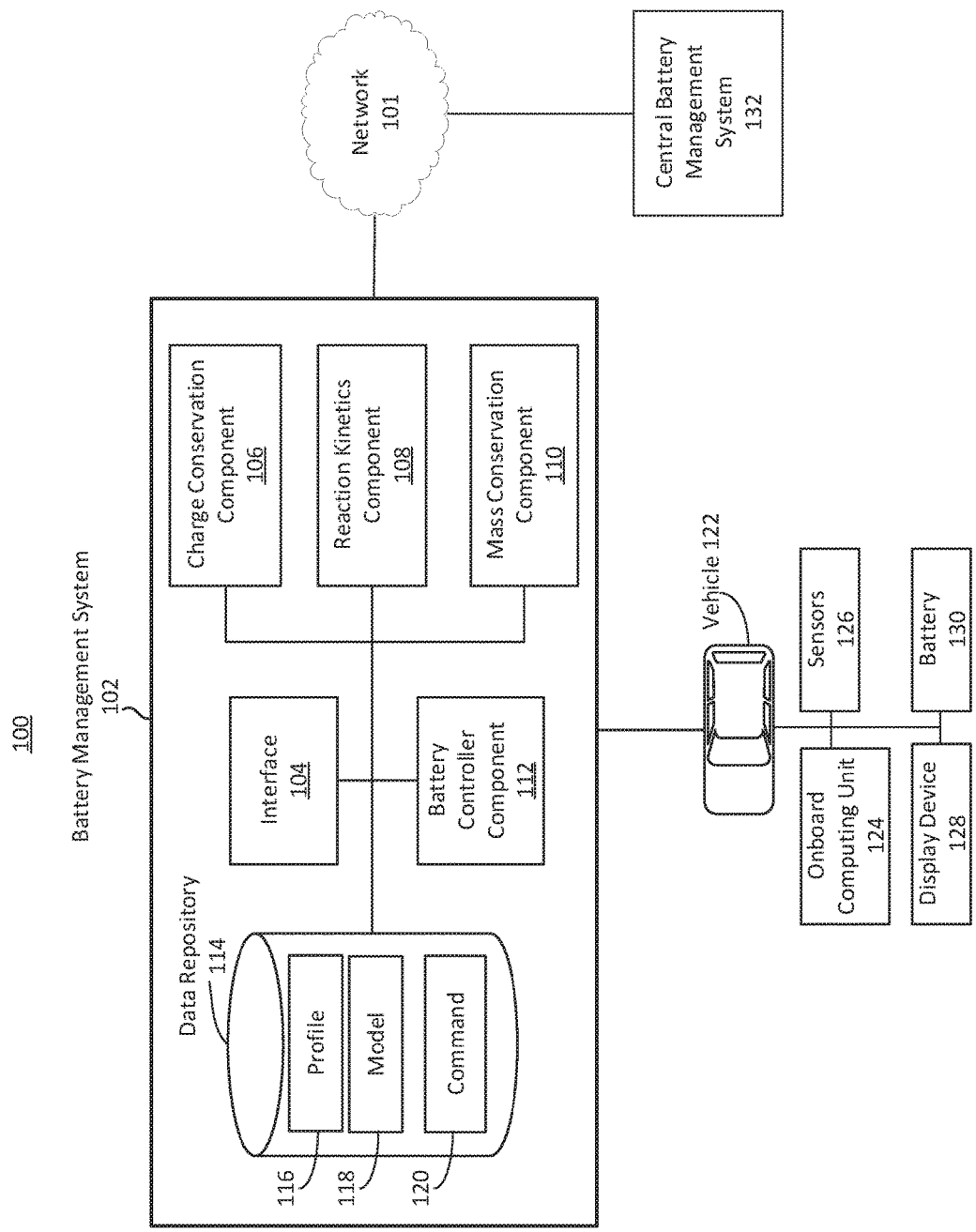
FIG. 1 depicts a block diagram depicting an example system to manage battery performance of a vehicle, in accordance with an implementation.

Following below are more detailed descriptions of various concepts related to, and implementations of, methods, apparatuses, and systems of managing battery performance of a vehicle. The various concepts introduced above and discussed in greater detail below may be implemented in any of numerous ways.

The present disclosure is directed to systems and methods of managing battery performance of a vehicle, such as an electric vehicle or hybrid electric and gas vehicle. The vehicle, for example, can include one or batteries having one or more battery cells. The batteries can provide power to various component of the vehicle, such as an electric motor. To determine or predict the amount of battery power available, such as in order to estimate the distance an electric vehicle can travel before recharging the battery, a battery management system can measure or identify values associated with the battery use, and estimate an amount of remaining power, available power, or instantaneous available power in the battery.

However, accurately and reliably predicting performance-related metrics of the battery can be challenging due to various factors. For example, predicting battery performance can be computationally intensive, utilizing excessive amounts of processing power or memory utilization. Predicting battery performance can be slow or take a significant amount of time due to the level of complexity of the prediction techniques and the processing capacity of the battery management system or processors thereof. Further, there can be a tradeoff between the length of time the system can take to provide an estimate and the accuracy or reliability of the estimate. For example, a more accurate or reliable the estimate of a battery performance metric can take longer to generate as compared to a less accurate or reliable estimate. Thus, it can be challenging to determine or estimate a battery performance-related metric in real-time in order to generate a command to control an aspect of a vehicle having one or more components powered by the battery.

For example, a system having a mathematical model of a battery cell can determine aspects of the internal behavior of lithium-ion batteries. Such an electrochemical model may include simultaneously solving numerous strongly-coupled and non-linear partial differential equations, which can be computationally expensive (e.g., utilize excessive processing power, memory, or input/output or data read/write accesses). Due to the high computational resource utilization of the electrochemical model, it may be inefficient or not possible to apply the electrochemical model in a battery management system or to optimize battery cell design. Circuit models, as opposed to mathematical electrochemical models, are superior in terms of computational efficiency, but lack the physical meanings, thereby resulting in low accuracy and reliability. Physics based reduced order models ("ROM") can achieve a good balance between the accuracy and computational efficiency. However, the assumptions made in developing the ROM and the formulation of ROM strongly affect the accuracy of the results and the computational efficiency. For example, invalid or inaccurate inputs or assumptions, or erroneous treatments, can result in large errors.

A physics-based pseudo-two-dimensional (P2D) Li-ion cell model includes five main components (e.g., governing equations): electrical charge conservation in the electrode and the electrolyte, mass conservation of $Li^+$ in the particle and the electrolyte, and the charge-transfer reaction kinetics between particles and the electrolyte. Based on the five components, a thermal energy balance physics can be included in the model to compute heat generation and temperature rise under electrical load. In addition, the P2D can be versatile enough to incorporate various phenomena occurring in a cell such as the diffusion-induced mechanical stress within particles, formation of the solid electrolyte interphase (SEI) layer, and plating of $Li^+$ during fast charging. However, it may be challenging to configure a battery management system (BMS) with the P2D model. It may be challenging to configure a BMS with the P2D because the P2D involves many material properties that are a function of $Li^+$ concentration and temperature. To accurately measure material properties is computationally and resource intensive. Moreover, it can be challenging to track changes in key parameters as the cell ages. Further, it can be computationally costly for real-time application, so the BMS may not be able to use the P2D for real-time applications or they may be a significant delay in processing. The P2D may use several partial different equations (PDEs), the solutions to which should correspond with all other set of governing equations at each discrete time step. If the BMS were to model individual cell in a pack to track individual cell state-of-x, where x may be charge, health, and power, the overall computational cost can quickly become prohibitively expensive and inefficient.

To reduce computation time associated with solving a full-order physics-based cell model, a reduced-order model (ROM) can be used. In a P2D full-order model, many particles are used to represent an electrode in the direction perpendicular to the current collector. This allows for accurately capturing current density distribution along the electrode thickness direction. Yet this process is computationally intensive as at each particle node involves solving a PDE. To reduce computation time, a common model reduction scheme can use a single particle to represent an electrode. When there is insufficient time to develop transience within a cell such as in a drive cycle where the applied electrical load is constantly changing, a single particle model may be sufficient to predict cell voltage. However, under prolonged electrical load such as in continuous discharge or fast charge cases where there is sufficient time to develop transience within a cell, the model prediction can significantly deviate from an actual measurement. In addition, the accuracy of state variables such as potential distribution or $Li^+$ concentration distribution within a Li-ion cell can suffer from using a single particle-based approach.

Systems and methods of the present technical solution provide a system to manage battery performance. The technical solution includes a battery management system configured with a multi-particle reduced order Li-ion battery model that can provide increased accuracy with computational efficiency. The battery management system (BMS) plays an important role in providing optimal performance while maintaining each battery pack. Tasks related to battery performance include determining state-of-charge (SOC), state-of-power (SOP), state-of-health (SOH), cell balancing, and battery charging. Additional functions include determining whether cells operate within specified static and dynamic voltage window and temperature range, derating power, detecting faulty cells, and generating notifications or alerts. The BMS can utilize an RC circuit model to model a Li-ion cell because of its robustness and low computation cost among other benefits. Since a corresponding circuit model (e.g., an RC model) may not be a physics-based model, the circuit model may not be able to predict battery SOH before battery degradation or failure may occur. A physics-based pseudo-2D (P2D) Li-ion cell model, on the other hand, may be more capable and versatile. For example, the model can provide $Li^+$ plating potential during fast charging and incorporate various physics-based degradation mechanisms such as evolution of the solid electrolyte interphase (SEI) layer and diffusion-induced mechanical stress. However, the use of P2D models in a battery management system (BMS) may be limited due to its computational complexity and computational resource intense nature because of a high computation cost associated with a full-order model. A single particle model approach is less accurate due to using the average current density in the calculation because only one particle is involved for each electrode domain. Under a continuous or high-pulse electrical load, the single particle model may fail to predict accurate cell voltage, or $Li^+$ plating potential.

Thus, systems and methods of the present technical solution provide a more accurate technique that uses less computational resources. For example, the battery management system of the present technical solution can be configured with a multi-particle reduced-order modeling technique. In this approach, the BMS can determine the charge-transfer reaction kinetics and charge balance governing equations first, and then determine the mass balance governing equations in sequence to minimize computational cost associated with iteratively solving mass balance partial differential equations (PDEs). To solve PDEs, the BMS can use a finite volume method. The use of the multiple particle modeling approach combined with either linear or nonlinear charge-transfer reaction kinetics allows to closely match cell voltage and current distributions predicted by a full-order model. Moreover, the multi-particle reduced-order model approach maintains computation cost like that of a single particle model. The BMS can validate the multi-particle model against a full-order model.

The BMS can use the multiple particle modeling approach combined with either linear or nonlinear charge-transfer reaction kinetics to closely match cell voltage and current distributions predicted by a full-order P2D. To maintain computation cost like that of a single particle model, the BMS can solve governing equations sequentially and numerically based on finite volume method. The use of multiple particles combined with either linear or nonlinear charge-transfer reaction kinetics can allow the BMS to capture current density distribution within an electrode under any type of electrical load. The BMS can maintain computational complexity like that of a single particle model, and less than a full-order model, by using a sequential process to determine governing values, thereby reducing an iterative solving process. For example, a battery management system of the present technical solution can solve the charge conservation equations along with reaction kinetics equations first, and then subsequently determine the mass conservation.

FIG. 1 depicts a block diagram depicting an example system to manage battery performance of a vehicle. The system 100 can include at least one battery management system 102 that is designed, constructed, or operational to receive input regarding a battery characteristic, and generate an output regarding a battery performance-related metric or other battery profile information. The battery management system ("BMS") 102 can include at least one interface 104, at least one charge conservation component 106, at least reaction kinetics component 108, at least mass conservation component 110, at least one battery controller component 112, and at least one data repository 114. The battery management system 102, or one or more component thereof, can include hardware or a combination of hardware and software, such as communications buses, circuitry, processors, communications interfaces, among others. The battery management system 102 can reside on or within a vehicle (e.g., vehicle 122), on a computing device, on a server, or other location or hardware infrastructure configured to facilitate vehicle or battery control, design, or manufacturing.

The data repository 114 can store, manage or reference information to facilitate battery control, design, or manufacturing. The data repository 114 can include one or more data structure, databases or data files to store the information. For example, the data repository 114 can include profile information 116, model information 118, or command information 120. The profile information 116 can include, for example, a profile data structure. The profile information 116 can include, for example, battery profile information such as electrochemical parameters. The profile can include electrochemical parameters for the battery, such as a particle size, an electrode thickness, a porosity, or an open circuit voltage. The profile information 116, including the input parameters of Table 1, can be input into a component of the battery management system 102 for further processing. Examples of additional profile information 116 are provided in Table 1.

TABLE 1

| Profile Information | |
|---|---|
| Name | Unit |
| Anode particle radius | μm |
| Cathode particle radius | μm |
| Anode solid diffusivity | $m^2/s$ |
| Cathode solid diffusivity | $m^2/s$ |
| Anode solid maximum concentration | $mol/m^3$ |
| Cathode solid maximum concentration | $mol/m^3$ |
| Anode stoichiometry at 0% SOC | — |
| Anode stoichiometry at 100% SOC | — |
| Cathode stoichiometry at 0% SOC | — |
| Cathode stoichiometry at 100% SOC | — |
| Cell cross area | $m^2$ |
| Anode film resistance | $\Omega\ m^2$ |
| Cathode film resistance | $\Omega\ m^2$ |
| Anode exchange current density at reference state | $A/m^2$ |
| Cathode exchange current density at reference state | $A/m^2$ |
| Electrolyte transference number | — |
| Initial electrolyte concentration | $mol/m^3$ |
| Electrolyte conductivity | S/m |

TABLE 1-continued

Profile Information

| Name | Unit |
| --- | --- |
| Electrolyte diffusivity | m²/s |
| Anode solid conductivity | S/m |
| Cathode solid conductivity | S/m |
| Anode thickness | μm |
| Separator thickness | μm |
| Cathode thickness | μm |
| Anode Bruggeman exponent | — |
| Separator Bruggeman exponent | — |
| Cathode Bruggeman exponent | — |
| Anode active materials volume ratio | — |
| Anode electrolyte volume ratio | — |
| Cathode active materials volume ratio | — |
| Cathode electrolyte volume ratio | — |
| Separator electrolyte volume ratio | — |
| Anode entropy coefficient | V/K |
| Cathode entropy coefficient | V/K |
| Anode open circuit voltage | V |
| Cathode open circuit voltage | V |

For example, cathode materials used in lithium batteries can include Lithium cobalt oxide $LiCoO_2$, Lithium nickel oxide $LiNiO_2$, Lithium manganese oxide $LiMn_2O_4$, or Lithium iron phosphate $LiFePO_4$. Example anode materials can include Carbon C, Lithium Li, or Lithium titanate $Li_2TiO_3$. The particle size can be measured as a radius. For example, the cathode or anode particle size can be 9 microns (μm), 10 microns, 11 microns, 11.2 microns, or some other value. The electrode thickness of the battery can also be measured in microns. The electrode thickness can refer to the thickness of the anode or the cathode. The porosity of a porous electrode can affect the kinetics for ionic diffusion.

The data repository 114 can include or store one or more models 118. The model 118 can refer to any model that can be used by the battery management system 102. To determine, predict, evaluate or otherwise identify parameter, metric, behavior or characteristic associated with a battery or battery cell (e.g., battery 130). Models 118 can include, for example, a solid concentration model, electrolyte concentration model, electrolyte potential model, or solid potential model. Models 118 can include a multi-particle model. The data repository 114 can store or include different models 118 for different types of batteries. The data repository 114 can include or store commands 120. Commands 120 can include, for example, instructions, control commands, vehicle controls, alerts, or notifications. Commands 120 can include instructions to modify or change a parameter or function related to battery utilization.

The system 100 can include or interface with a central battery management system 132. The central battery management system 132 can include one or more component or functionality of the battery management system 102. For example, the battery management system 102 can be referred to as a vehicle battery management system, and the central battery management system 132 can be remote from the vehicle battery management system. The central battery management system 132 can communicate or interface with the vehicle battery management system 102. The central battery management system 132 can communicate or interface with one or more component of the vehicle 122, for example via the battery management system 102.

Each of the components of the battery management system 102 or central battery management system 132 can be implemented using hardware or a combination of software and hardware. Each component of the battery management system 102 (or central battery management system 132) can include logical circuitry (e.g., a central processing unit or CPU) that responses to and processes instructions fetched from a memory unit (e.g., memory 615 or storage device 625). Each component of the battery management system 102 can include or use a microprocessor or a multi-core processor. A multi-core processor can include two or more processing units on a single computing component. Each component of the battery management system 102 can be based on any of these processors, or any other processor capable of operating as described herein. Each processor can utilize instruction level parallelism, thread level parallelism, different levels of cache, etc. For example, the battery management system 102 can include at least one logic device such as a computing device or server having at least one processor to communicate via the network 101. A battery management system 102 of the vehicle 122 can communicate with a different battery management system 102 or central battery management system 132.

The components and elements of the battery management system 102 can be separate components, a single component, or part of the battery management system 102. For example, the interface 104, charge conservation component 106, reaction kinetics component 108, mass conservation component 110, battery controller component 112 (and the other elements of the battery management system 102) can include combinations of hardware and software, such as one or more processors configured to initiate stop commands, initiate motion commands, and transmit or receive timing data, for example.

One or more component of the battery management system 102 can be hosted on or within a vehicle 122. One or more components of the battery management system 102 can reside outside or remote from the vehicle 122, and be in communication with the vehicle for at least a certain time period. For example, portions of data illustrated on the data repository 114 can reside on a remote server, a central battery management system 132, or cloud of servers, that can maintain profile information, models, commands, or other information that can be accessed by the battery management system 102 (e.g., through network 101). The components of the battery management system 102 can be connected or communicatively coupled to one another. The connection between the various components of the battery management system 102 can be wired or wireless, or any combination thereof. Counterpart systems or components can be hosted on other vehicles to enable communication or coordination between vehicles.

The network 101 can include computer networks such as the internet, local, wide, near field communication, metro or other area networks, as well as satellite networks or other computer networks such as voice or data mobile phone communications networks, and combinations thereof. The network 101 can include or constitute an inter-vehicle communications network, e.g., a subset of components including the battery management system 102 and components thereof for inter-vehicle data transfer. The network 101 can include a point-to-point network, broadcast network, telecommunications network, asynchronous transfer mode network, synchronous optical network, or a synchronous digital hierarchy network, for example. The network 101 can include at least one wireless link such as an infrared channel or satellite band. The topology of the network 101 can include a bus, star, or ring network topology. The network 101 can include mobile telephone or data networks using any protocol or protocols to communicate among vehicles or other devices, including advanced mobile protocols, time or code division multiple access protocols, global system for mobile communication protocols, general packet radio services protocols, or universal mobile telecommunication system protocols, and the same types of data can be transmitted via different protocols.

The vehicle 122 can refer to any type of vehicle or automobile such as cars, trucks, vans, sports utility vehicles, motorcycles, self-driving vehicle, driver assist vehicle, electric vehicle, hybrid vehicle, or fossil fuel powered vehicle. The vehicle 122 can include an onboard computing unit 124. The onboard computing unit 124 can include one or more of hardware, software or firmware. The onboard computing unit 124 can include digital components or circuitry, including, for example, one or more component depicted in FIG. 6.

The onboard computing unit 124 can include or interface with, for example, an electronic control unit ("ECU") of the vehicle 122 to provide drive-by-wire functionality. The onboard computing unit 124 can include or be referred to as an automotive computer, and can include a processor or microcontroller, memory, embedded software, inputs/outputs and communication link(s). An ECU involves hardware and software to perform the functions expected from that particular module. For example, types of ECU include Electronic/engine Control Module (ECM), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), control unit, or control module. Other examples include domain control unit (DCU), Electric Power Steering Control Unit (PSCU), Human-machine interface (HMI), Telematic control unit (TCU), Speed control unit (SCU), Battery management system (BMS). For example, the onboard computing unit 124 of the vehicle 122 can query one or more component or module of vehicle 122 to determine a status of the vehicle 122, which can include, for example, a location or GPS position of the vehicle, speed of the vehicle, acceleration of the vehicle, turn angle of the vehicle, orientation of the vehicle, throttle of the vehicle, brake status or brake amount, or other information.

The vehicle 122 can include or interface with one or more sensors 126. The sensors 126 can be coupled to or associated with a vehicle 122. The sensors 126 can provide information to the battery management system 102. The one or more vehicle 122 can include sensors 126 that are designed, constructed, configured or operational to detect a value of a current output from the battery 130. Sensors 126 can include measurement devices configured to measure, detect, or determine characteristics of electricity associated with a battery 130 of the vehicle, such as a current, voltage, or impedance. Sensors 126 can include an ammeter, volt meter, or multimeter. The sensor 126 can measure current, such as a flow of electric charge or coulombs per second in units of amperes. Sensors 126 can include a temperature sensor, thermometer, or ambient temperature sensor. The sensors 126 can be part of the vehicle 122, or remote from the vehicle 122. Sensors 126 can include, for example, a radar sensor, lidar sensor, or camera. Sensors 126 of the vehicle 122 can include accelerometers, gyroscopes, weight sensors, or proximity sensors, that can collect, detect or determine vehicle dynamics information such as orientation data, velocity, or weight. The sensor 126 can identify, measure, detect or otherwise determine a value of a current output by the battery 130 (or one or more cells thereof) that supplies power to the vehicle 122. The sensor 126, or onboard computing unit 124 or battery management system 102, can receive the value of the current output. The sensor 126, onboard computing unit 124, or battery management system 102 can associate the value of the current output with a timestamp. The timestamp can correspond or refer to the time at which the value of the current was detected or identified by the sensor 126. The timestamp can correspond or refer to the time at which the value of the current was received by the onboard computing unit 124, battery management system 102 or stored in a data repository 114. The timestamp can correspond or refer to a time at which the battery outputs the current. The timestamp can be relative, based on a local time, based on a GPS time, or based on a universal time. The timestamp can be a sample count, such as a numerical consecutive counter (e.g., 1, 2, 3, 4).

Sensors 126 can include one or more sensing elements or transducers that capture, acquires, records or converts information about vehicle 122 or environment into a form for processing. The sensor 126 can acquire one or more images or recordings (e.g., photographic, radar, ultrasonic, millimeter wave, infra-red, ultra-violet, light detection and ranging or lidar, or audio, or video). The sensor 126 can communicate sensed data to the battery management system 102 for processing.

The sensor 126 can include a camera as well as one or more sensors of one or more types. For example, the sensor 126 can include a Radar, light detection and ranging (LIDAR), ultrasonic, or vehicle-to-everything (V2X) (e.g., vehicle-to-vehicle (V2V), V2I, vehicle-to-device (V2D), or vehicle-to-passenger (V2P)) sensor or interface. The sensor 126 can include a global positioning system (GPS) device that can determine a location of the vehicle using map data. The sensor 126 can detect (e.g., using motion sensing, imaging or any of the other sensing capabilities) whether any other vehicle or object is present at or approaching the vehicle 122.

The vehicle 122, via sensor 126 or the onboard computing unit 124, can interface or communicate with a location system via network 101. The location system can include any device based on a positioning system such as Global Navigation Satellite System (GNSS), which can include GPS, GLONASS, Galileo, Beidou and other regional systems. The location system can include one or more cellular towers to provide triangulation. The location system can include wireless beacons, such as near field communication beacons, short-range wireless beacons (e.g., Bluetooth beacons), or Wi-Fi modules. The vehicle 122 can include or interface with a device, component, antenna, or other module or element to determine a location of the vehicle 122 via the location system.

The vehicle 122 can include a display device 128. The display device 128 can include, for example, a vehicle dash, LCD, LED, or other electronic or digital visual display communicatively coupled to the onboard computing unit 124 or battery management system 102. The display device 128 can include a heads-up display, mechanical display, or digital or electronic display.

The vehicle 122 can include a battery 130. The battery 130 can be a rechargeable battery. The battery can be a one-time-use or disposable battery. The battery can include one or more battery cells. For example, battery 130 can refer to multiple battery cells. The multiple battery cells can be independent from one another, but stored in a same physical container or area. The multiple battery cells of the battery 130 can be electronically or communicatively coupled to on another. For example, the one or more battery cells in the battery 130 can be connected by electronic circuitry in a series or in a parallel configuration. The battery management system 102 can monitor, manage, or control aspects of the battery 130.

The battery 130 can include one or more cells. A cell can refer to the electrochemical current-producing unit in a battery, consisting of a set of positive plates, negative plates, electrolyte, separators and casing. The cell can have an open-circuit voltage of, for example, 1 volt, 2 volts, 3 volts, volts or some other voltage. There can be multiples cells in a single battery 130. Types of batteries 130 or battery cells can include, for example, lead-acid ("flooded", deep-cycle, and VRLA), NiCd, nickel-metal hydride, lithium-ion, Li-ion polymer, zinc-air or molten-salt batteries.

A lithium-ion battery or Li-ion battery (abbreviated as LIB) is a type of rechargeable battery in which lithium ions move from the negative electrode to the positive electrode during discharge and back when charging. Li-ion batteries use an intercalated lithium compound as one electrode material, compared to the metallic lithium used in a non-rechargeable lithium battery. The electrolyte, which allows for ionic movement, and the two electrodes are the constituent components of a lithium-ion battery cell. For example, lithium-ion battery can be used to provide power to an electric vehicle 122. A lithium-ion battery can have a high energy density, low memory effect, and a low self-discharge. Types of lithium based batteries 130 can include, for example, Lithium iron phosphate ($LiFePO_4$), lithium ion manganese oxide battery ($LiMn_2O_4$, $Li_2MnO_3$, or LMO), and lithium nickel manganese cobalt oxide ($LiNiMnCoO_2$ or NMC), lithium nickel cobalt aluminum oxide ($LiNiCoAlO_2$ or NCA) and lithium titanate ($Li_4Ti_5O_{12}$ or LTO), or lithium-sulfur batteries.

The battery management system 102 can include an interface 104. The interface 104 can be configured to use one or more protocols, wires, connectors, or ports to communicate with or facilitate communication among the one or more components of the battery management system 102, vehicle 122, or central battery management system 132. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can be designed, constructed or operational to communicate with one or more sensors 126 to collect or receive information. The interface 104 can be designed, constructed or operational to communicate with a charge conservation component 106, reaction kinetics component 108, mass conservation component 110, battery controller component 112 or data repository 114.

The battery management system 102 can include, interface or otherwise access a battery controller component 112. The battery controller component 112 can be referred to as a main component, orchestrator component, or master component. For example, the battery controller component 112 can orchestrate, manage, or maintain one or more other components of the battery management system 102, such as the charge conservation component 106, reaction kinetics component 108, or the mass conservation component 110. For example, the battery controller component 112 can receive, from sensor 126, a characteristic of electricity associated with the battery 130. The characteristic of electricity associated with the battery 130 can include, for example, a current or flow of charge (e.g., represented in units such as amperes, or milliamperes). The current can correspond to moving electrons in a wire or carried by ions in an electrolyte.

The battery management system 102 (e.g., via battery controller component 112) can receive, detect, identify, or measure a value of a current output by the battery 130. The battery 130 can supply power to one or more component or motor of the vehicle 122. The battery management system 102 (e.g., via battery controller component) can provide, responsive to receiving the value of the current, the value of the current to one or more component of the battery management system 102 for further processing. The value of the current can include or refer to a time-dependent function of the current, or a sample or value of the current at a specific time, such as corresponding to a timestamp.

Table 2 illustrates an example full-order electrochemical model. The functions of the full-order electrochemical model illustrated in Table 2 can resolve the solid concentration in the particle domain (the coordinate along particle radius is denoted as r), and the electrolyte concentration, electrolyte potential and solid potential in the electrode domain (the coordinate along electrode thickness is denoted as x). The thickness of anode can be denoted as $l_n$, the thickness of separator as $l_s$, and the thickness of cathode as $l_p$. The anode, separator and cathode can occupy the regions of $0 \leq x \leq l_n$, $l_n \leq x \leq l_n+l_s$, and $l_n+l_s \leq x \leq l_n+l_s+l_p$, respectively.

TABLE 2

Governing Functions and boundary conditions of the electrochemical model

| Domain | Governing Equations | Boundary and Initial Conditions |
|---|---|---|
| Particle | $\dfrac{\partial c_s}{\partial t} = \dfrac{D_s}{r^2}\dfrac{\partial}{\partial r}\left(r^2\dfrac{\partial c_s}{\partial r}\right)$ | F1 $r=0: \dfrac{\partial c_s}{\partial r}=0;\ r=r_p: D_s\dfrac{\partial c_s}{\partial r}=-\dfrac{i}{F}$ <br><br> $t=0: c_s=c_{s0}$ |
| Electrode | $\dfrac{\partial}{\partial x}\left(\sigma_s^{eff}\dfrac{\partial \phi_s}{\partial x}\right)-a_s i=0$ <br><br> $\dfrac{\partial}{\partial x}\left(\kappa_e^{eff}\dfrac{\partial \phi_e}{\partial x}+\kappa_D^{eff}\dfrac{\partial \ln c_e}{\partial x}\right)+a_s i=0$ <br><br> where | F2 $x=0: \phi_s=0;\ x=l_n: \dfrac{\partial \phi_s}{\partial x}=0;$ <br><br> $x=l_n+l_s: \dfrac{\partial \phi_s}{\partial x}=0;$ |

TABLE 2-continued

Governing Functions and boundary conditions of the electrochemical model

| Domain | Governing Equations | Boundary and Initial Conditions |
|---|---|---|
| | $\kappa_D^{eff} = -\dfrac{2RT\kappa_e^{eff}}{F}\left(1 + \dfrac{d\ln f_\pm}{d\ln c_e}\right)(1 - t_+)$ | $x = l_n + l_s + l_p: \sigma_s^{eff}\dfrac{\partial \phi_s}{\partial x} = -i_{app}.$ |
| F3 | $\varepsilon_e \dfrac{\partial c_e}{\partial t} = \dfrac{\partial}{\partial x}\left(D_e^{eff}\dfrac{\partial c_e}{\partial x}\right) + \dfrac{(1 - t_+)}{F}a_s i$ | $x = 0: \dfrac{\partial \phi_e}{\partial x} = 0; x = l_n + l_s + l_p: \dfrac{\partial \phi_e}{\partial x} = 0.$ |
| F4 | | $x = 0: \dfrac{\partial c_e}{\partial x} = 0; x = l_n + l_s + l_p: \dfrac{\partial c_e}{\partial x} = 0$ |
| | | $t = 0: c_e = c_0.$ |

Table 2 provides Function 1 (F1), Function 2 (F2), Function 3 (F3), and Function 4 (F4). In Table 2, $c_s$ is the lithium concentration in the solid (mol L$^{-1}$), D, is the lithium diffusivity in the solid (m$^2$ s$^{-1}$), $r_p$ is particle radius (m), F is the Faraday constant (C mol$^{-1}$), i is the intercalation current per unit area (A m$^{-2}$), $C_{s0}$ is the initial lithium concentration in the solid (mol L$^{-1}$), $\sigma_s^{eff}$ is the effective solid conductivity (S m$^{-1}$), $\phi_s$ is the potential in the solid (V), $a_s$ is the active surface area per unit electrode volume (m$^{-3}$), $i_{app}$ is the applied current density to the electrode (A m$^{-2}$) with the sign defined as $i_{app}$>0 for discharge, $\kappa_e^{eff}$ is the effective electrolyte conductivity (S m$^{-1}$), $\phi_e$ is the potential in the electrolyte (V), R is the gas constant (J K$^{-1}$ mol$^{-1}$), T is temperature (K), $f_\pm$ is the electrolyte activity coefficient, $t_+$ is the lithium ion transference number, $\varepsilon_e$ is the electrolyte volume fraction, $c_e$ is the lithium concentration in the electrolyte (mol L$^{-1}$), $D_e^{eff}$ is the effective electrolyte diffusivity (m$^2$ s$^{-1}$) and $c_0$ is the initial lithium concentration in the electrolyte (mol L$^{-1}$).

The intercalation current density, i (A m$^{-2}$), is zero in the separator region. In the anode and cathode regions the current density (or local current distribution) is given by Function 5 (e.g., the Butler-Volmer equation) as follows, $$i = i_0\left(\exp\left(\dfrac{\beta F\eta}{RT}\right) - \exp\left(-\dfrac{(1-\beta)F\eta}{RT}\right)\right),$$ [Function 5]

where $i_0$ is the exchange current density (A m$^{-2}$), $\beta$ is the anodic charge transfer coefficient, and $\eta$ is the over-potential (V) determined by Function 6:

$$\eta = \phi_s - \phi_e - U(c_{s,surf}),$$ [Function 6]

where U is the open circuit potential (V) which depends on the lithium concentration at the particle surface, $c_{s,surf}$ (mol m$^{-3}$). The exchange current density can be determined by Function 7 as follows $$i_0 = Fk c_{s,surf}^{1-\beta} c_e^\beta (c_{s,max} - c_{s,surf})^\beta,$$ [Function 7]

where k is the reaction rate constant m$^{2.5}$ mol$^{0.5}$ s$^{-1}$ and $C_{s,max}$ is the maximum lithium concentration in the particle (mol m$^{-3}$).

In Table 2, the active surface area per unit electrode volume (m$^{-1}$) can be determined by $a_s = 3\varepsilon_s/r_p$, if the particle shape is spherical, where $\varepsilon_s$ is the solid volume fraction. The effective solid conductivity, effective electrolyte diffusivity and effective electrolyte conductivity can be determined by Function 8:

$$\sigma_s^{eff} = \sigma_s\dfrac{\varepsilon_s}{\tau_s}, \; D_e^{eff} = D_e\dfrac{\varepsilon_e}{\tau_e}, \; \kappa_e^{eff} = \kappa_e\dfrac{\varepsilon_e}{\tau_e},$$ [Function 8]

where $\sigma_s$ is the solid bulk conductivity (S m$^{-1}$), $\tau_s$ is the solid tortuosity, $D_e$ and $\kappa_e$ are the bulk electrolyte diffusivity (m$^2$ s$^{-1}$) and conductivity (S m$^{-1}$), $\varepsilon_e$ is the electrolyte volume fraction and $\tau_e$ is the electrolyte tortuosity. The tortuosity of the solid and the electrolyte can be determined by Function 9 (e.g., by the Bruggeman relation), $$\tau = \varepsilon^{1-\alpha}, \tau_e = \varepsilon_e^{1-\alpha},$$ [Function 9]

where $\alpha$ is the Bruggeman exponent.

The differential equations in Functions 1, 2, 3 and 4 and the algebraic equations in Functions 5, 6, 7, 8 and 9 can be referred to as the full-order electrochemical model. These strongly coupled non-linear equations and functions of the full-order model can make the simulation computationally expensive. Thus, the battery management system 102 of the present technical solution can be configured with a multi-particle reduced-order model as well as further improvements to reduce computational resource utilization and processing duration, while maintaining or improving the accuracy of the performance metric results, thereby allow for battery management on a real-time or near real-time bases in an electric or hybrid vehicle.

The battery management system 102 of the present technical solution is improved or optimized to reduce computational resource utilization, while providing an accurate result, by establishing the following configurations to be used by determining the charge conservation equations along with reaction kinetics equations first, and then subsequently solving the equations associated with mass conservation. The outputs from the three components 106, 108 and 110 can further feed back to the battery controller component 112 to calculate the voltage and heat generation rate.

For example, the battery management system 102 can be configured with multiple functions. The functions can receive inputs corresponding to electrochemical parameters associated with a battery 130, profile information 116 of the battery, characteristics of electricity associated (e.g., current value, or current values as a function of time) with the battery 130. The functions can be based on a model, such as a full-order electrochemical model for a battery 130. However, the battery management system 102 of the present technical solution can be configured with improved techniques in order to reduce computational resource consumption and processing time, while maintaining or improving accuracy of the results by using a reduced-order electrochemical model. The battery management system 102, via one or more components 106, 108 and 110, can process the functions to determine an output performance-related metric, such as voltage level of the battery 130 or heat generation rate of the battery 130. The battery management system 102 can utilize a reduced order model configured for the lithium-ion battery to update at least one of the solid concentration model, the electrolyte concentration model, the electrolyte potential model, or the solid potential model.

To further improve efficiency, the battery controller component 112 can simultaneously provide the value of the current to multiple components of the battery management system 102 for processing in parallel, or in an at least partially overlapping manner. By having multiple components of the battery management system 102 independently process the input current value, the battery management system 102 can reduce delay in predicting or estimating a metric associated with battery performance, while also providing increased flexibility and tuning for processing techniques since the components can be independently configured and tuned to process the input current value. This process of providing the current information or values to each of the charge conservation component 106 and reaction kinetics component 108. Subsequently, the battery controller component 112 can cause the mass conservation component 110 to execute based on the output from the charge conservation component 106 and reaction kinetics component 108. Thus, the battery management system 102 of the present disclosure, using the battery controller component 112, can maintain computational complexity like that of a single particle model, which is less than a full-order model, by using a sequential process to determine governing values (e.g., via charge conservation component 106 and reaction kinetics component 108), thereby reducing an iterative solving process. Thus, the battery management system 102 of the present technical solution can solve the charge conservation equations along with reaction kinetics equations first, and then subsequently determine the mass conservation, thereby avoiding iterations that can cause a high computational cost in a full order model, while also avoiding inaccuracies that can be caused in a single particle reduced order model.

The battery management system 102 can use a multiparticle model or processing technique that includes separate sequential processing steps that can reduce the number or complexity of iterative steps. For example, during discharge, $Li^+$ cations move from the negative electrode to the positive electrode, and vice versa during charge. Because the electrical charge can be conserved in the model, the net average current from one electrode to the other may be the same but opposite in sign at any point in time. While the net average current may be constrained, the current still can vary within an electrode. Control-oriented ROMs can use a single particle to represent each positive and negative electrode while a full-order model can use tens of particles within an electrode. If only one particle is used, the BMS 102 may use the average current density in the calculation. Thus, using a single particle can significantly reduce the computation time at the expense of losing accuracy of current distribution within an electrode. In a full-order model, governing equations associated with mass conservation, charge conservation, and the reaction kinetics are solved simultaneously to converge. In the present technical solution, the BMS 102 can solve the charge conservation equations along with reaction kinetics equation first followed by solving equations associated mass conservation. This is based on a premise that the electrical field and the charge-transfer reaction processes may occur at a smaller time scale than the diffusion process time scale. Charge conservation and reaction kinetic equations may be solved either non-iteratively or iteratively until solutions converge while mass conservation equations are solved sequentially in a non-iterative manner. Solving equations in a sequential manner can reduce computation time because it may involve fewer number of iterations. To accurately capture current distribution within an electrode, the BMS can adapt to any number of particles specified within an electrode. This allows to better predict the cell voltage output and state variables within a cell under both continuous and pulsing electrical load.

To do so, the BMS 102 can be configured with a main function (e.g., battery controller component 112) with sub-routine functions (e.g., charge conservation component 106, reaction kinetics component 108 and mass conservation component 110). Input to the components 106, 108 and 110 can include the applied electrical load (e.g., a value of the current output from the battery corresponding to a timestamp) and ambient temperature, and the output from the battery controller component 112 can include cell voltage and temperature. In addition, $Li^+$ concentration distribution in the electrolyte and particles, electrical potential distribution in the electrolyte and electrode can be determined.

Figure 4:
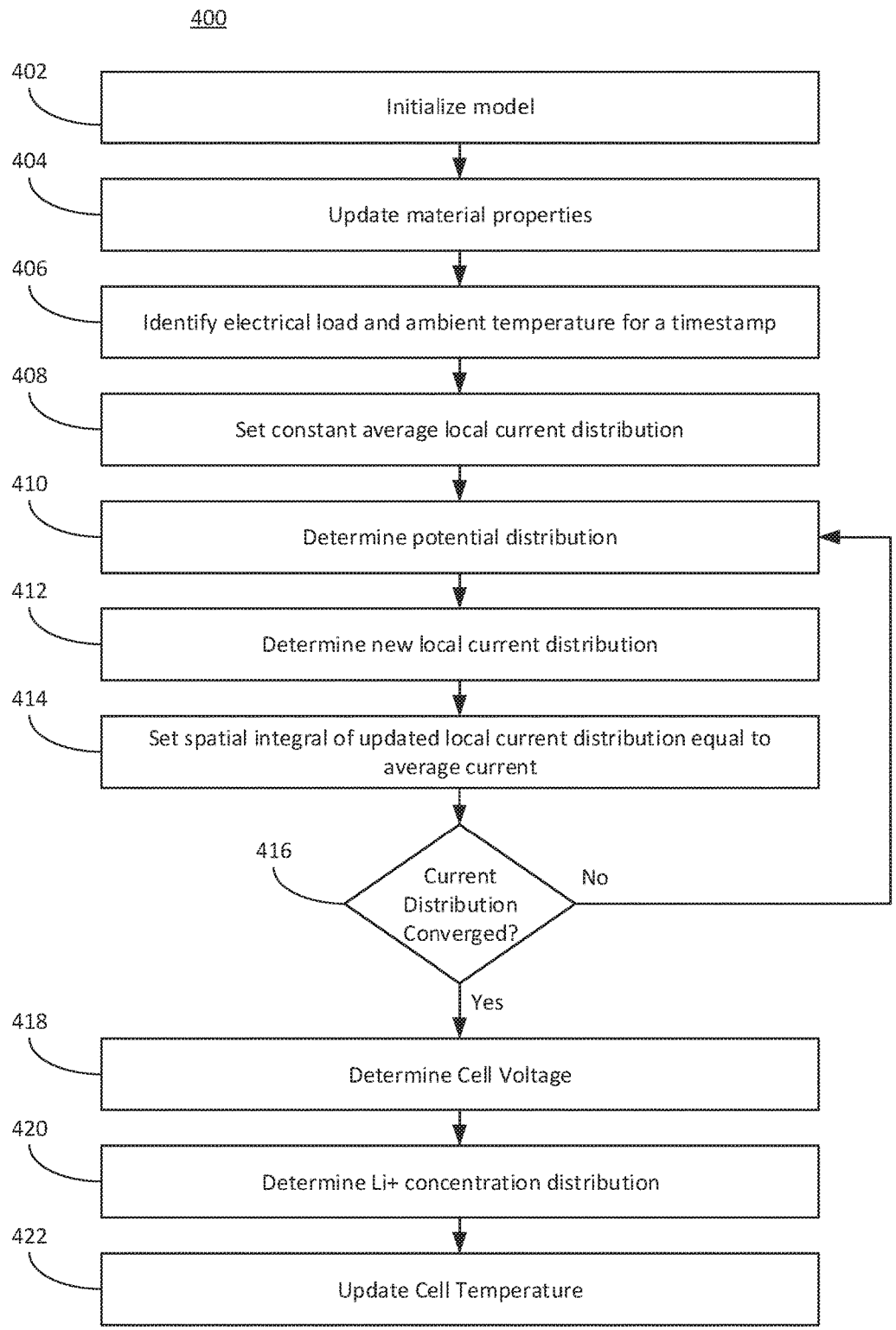
FIG. 4 depicts an example flow diagram of a process to manage battery performance of a vehicle, in accordance with an implementation.

The BMS 102 (e.g., via the charge conservation component 106, reaction kinetics component 108, and mass conservation component 110) can perform process 400 depicted in FIG. 4.

Referring now to FIG. 4, the BMS 102 can perform process 400. At 402, the BMS 102 can initialize a model. For example, the BMS 102 (e.g., via battery controller component 112, charge conservation component 106, reaction kinetics component 108 or mass conservation component 110) can initialize a multi-particle model including $Li^+$ concentration in the electrolyte and particles as well as cell temperature. The $Li^+$ concentration in the electrolyte can be 1,200 moles/m$^3$, for example. The $Li^+$ concentration in the particles of the negative electrode can be 200-40,000 mole/m$^3$, for example. The $Li^+$ concentration in the particles of the positive electrode can be 10,000-50,000 moles/m$^3$, for example.

At 404, the BMS 102 can update material properties. For example, the BMS 102 can update material properties based on $Li^+$ concentration and temperature. Material properties can include one or more properties in Table 2, for example. Material properties can be obtained from profile 116 of the battery 130. Material properties can include, for example, an ionic conductivity of the electrolyte, or diffusion coefficient.

At 406, the BMS 102 can identify an electrical load and an ambient temperature for a timestamp. For example, the BMS 102 can apply the prescribed electrical load and ambient temperature at a given timestamp to the cell model. The electrical load can include, for example, a power or current value. The electrical load can be measured by a sensor 126. The electrical load can be input by a simulation or model. The electrical load can, therefore, be an offline value or a real-time, online value.

At 408, the BMS 102 can set a constant average local current distribution. The local current distribution can be the current value divided by an area of the cell of the battery 130. The BMS 102 can be initially configured with a constant average local current distribution in both positive and negative electrode domains. This initial constant average local current distribution can be based on a default configuration file, default value, based on a profile 116 for the battery, or determined based on material properties, or the electrical load.

At 410, the BMS 102 can determine a potential distribution. For example, given a local current distribution, the BMS 102 can numerically determine the potential distribution in the electrolyte and the electrodes (positive and negative electrodes). The BMS 102 can use a multi-particle model to determine the potential distribution. The BMS 102 can use the charge conservation component 106 or reaction kinetics component 108 to determine the potential distribution in the electrolyte and the electrode. The BMS 102 can use one or more of functions 1-9 to determine the potential distribution in the electrolyte and the electrodes. The BMS 102 can use numerical techniques, such as a finite difference or a finite volume method to determine the potential distribution. The BMS 102 can determine the potential distribution for each particle in the multi-particle model. The BMS 102 can determine the partial differential equations or use other numerical techniques to solve for each particle in the multi-particle model at 410.

At 412, the BMS 102 can determine a new local current distribution. The BMS 102 can use the potential distribution determined at 410 to determine a new local current distribution based on the Butler-Volmer reaction kinetic equation (e.g., via reaction kinetics component 108).

At 414, the BMS 102 sets the spatial integral of updated local current distribution within electrode can to be equal to the applied average current, which can be configured at 408. The BMS 102 may be pre-configured with this spatial integral, which can be a limiting or boundary condition for the solution. The spatial integral can refer to a boundary of the local current distribution.

At 416, the BMS 102 can determine whether the local current distribution has converged. Convergence can refer to a consistent value of the local current distribution. Convergence can refer to or include when the new current distribution and previously determined current distribution are the same or substantially the same (e.g., within an error threshold such as 1%, 2%, 3%, 4%, 5%, 10%, 15%, or 20%, or less of one another). The BMS 102 can determine that the current distribution has converged if the delta or difference between two consecutive current distribution values is within an error threshold (e.g., an absolute value).

If the BMS 102 determines that the local current distribution has not converged, then the BMS 102 can return to ACT 410 and determine the potential distribution using the new local current distribution determined at 412. For example, the BMS 102 can determine, based on the local current distribution, a potential distribution in an electrolyte and the positive or negative electrode of a cell of the battery 130. The BMS 102 can update, based on the potential distribution and a Butler-Volmer reaction kinetic equation, the local current distribution to establish a new local current distribution. Thus, the BMS 102 can iteratively update the local current distribution until the local current distribution converges. The number of iterations or times the BMS 102 repeats ACT 410-416 can depend on the error threshold. For example, the number of iterations can be 5 iterations, 6 iterations, 7 iterations, 10 iterations, or more. The BMS 102 can increase or decrease the error threshold to reduce or increase the number of iterations. For example, to reduce latency or computing resource utilization, the BMS 102 can increase the error threshold such that the BMS 102 performs fewer iterations. However, to increase accuracy or reliability, the BMS 102 can reduce the error threshold. However, these iterations may not include the ACT 420 of determining the Li+ concentration distribution, thereby reducing computing resource utilization.

For example, the BMS 102 can identify a constant average local current distribution in a positive electrode and a negative electrode of a cell of the battery 130. The BMS 102 can determine, based on the constant average local current distribution, a potential distribution in an electrolyte, the positive electrode and the negative electrode of the cell of the battery. The BMS 102 can determine, based on the potential distribution and a Butler-Volmer reaction kinetic equation, the local current distribution. The BMS 102 can update, based on the local current distribution, the potential distribution in the electrolyte, the positive electrode and the negative electrode of the cell of the battery 130. The BMS 102 can update, based on the updated potential distribution and the Butler-Volmer reaction kinetic equation, the local current distribution. Thus, the BMS 102 can iteratively update the local current distribution until the local current distribution converges.

When, for example, the BMS 102 determines at 416 that the current distribution has converged, then the BMS 102 can proceed to 418. If the BMS 102 determines that the current distribution has converged, then the new local current distribution can be referred to as the converged current distribution or final current distribution for the timestamp. Thus, the BMS 102 can repeat ACTS 410-414 until the local current distribution solution converges. These ACTS can be repeatedly performed by the charge conservation component 106 and the reaction kinetics component 108.

At 418, the BMS 102 can determine the cell voltage. The BMS 102 can determine the battery (or a cell thereof) voltage based on the local current distribution determined at 416.

At 420, the BMS 102 can determine the $Li^+$ concentration distribution. Based on the local current distribution determined at 412, the BMS 102 (e.g., via mass conservation component 110) can determine the $Li^+$ concentration distribution in the electrolyte and particles, and update the multi-particle model accordingly. Thus, the BMS 102 may only update the $Li^+$ concentration distribution once per timestamp, as opposed to each time the BMS 102 iterates through ACT 410-416, thereby reducing computing resource utilization. Further, the BMS 102 can determine the $Li^+$ concentration distribution for multiple particles because the BMS 102 can perform this determination only once for each timestamp because it is outside the loop 410-416.

At 422, the BMS 102 can update the cell temperature. The BMS 102 (e.g., battery controller component 112) can determine the thermal power and update the cell temperature accordingly. The BMS 102 can determine the thermal power and update the cell temperature using, for example, the $Li^+$ concentration distribution, cell voltage, or new local current distribution determined at ACTS 412, 418 or 420.

The BMS 102 can repeat ACTS 402-422 until an end-condition or termination event. For example, the BMS 102 can repeat the process 400 for each timestamp in the simulation, or for as long as the vehicle is on or active and the battery is in use. The BMS 102 can repeat process until the battery is disabled or in a standby mode. The BMS 102 can repeat the process based instructions provided via an interface or onboard computing unit 124.

For example, the BMS 102 can receive or identify a second value of the current output corresponding to a second timestamp. The BMS 102 can determine the local current distribution that converges based on the second value of the current output corresponding to the second timestamp. The BMS 102 can determine, via the multi-particle model and subsequent to determination of the local current distribution that converges based on the second value of the current output corresponding to the second timestamp, the concentration distribution for the second timestamp. The BMS 102 can determine a second value of the voltage of the battery 130 for the second timestamp. The BMS 102 can determine, based on the second value of the voltage of the battery 130 and the concentration distribution for the second timestamp, a second temperature of the battery 130 for the second timestamp. The BMS 102 can generate, based on the second value of the voltage of the battery 130 or the second temperature of the battery 130, a second command to manage the performance of the battery.

The BMS 102 can use a multiple particle model to represent the electrodes (e.g., negative electrode and positive electrode), as opposed to a ROM using a single particle to represent the electrodes. Using multiple particle avoids the model from using the average current density in the calculation, thereby improving the accuracy of the result. The BMS 102 can reduce computation time so that the model can be used in a real-time application by solving many partial differential equations ("PDEs") associated with each particle in a sequential manner without involving any iterative process. This approach allows to accurately predict cell voltage under both continuous and pulsing electrical load while maintaining computation time on the same order of magnitude as a single particle-based ROM.

For example, the charge conservation component 106 and the reaction kinetics component 108 of the present technical solution can determine, via the multi-particle model, a local current distribution that converges via ACTS 410-416 in process 400.

Thus, the BMS 102 can determine an accurate current distribution, which is can be used to solve the $Li^+$ concentration distribution and the electrical potential distribution. Low computational cost allows the BMS 102 to use the model in a real-time application, while higher accuracy allows to use the model in a real-time application to avoid events such as $Li^+$ plating that may lead to cell aging. With reduced computational time, the model may also be combined with an optimization algorithm to quickly find an optimal set of cell parameters that match experimental results.

For example, the battery management system 102 can include, interface or otherwise access a charge conservation component 106. The charge conservation component 106 can receive the value of the current and profile information for the battery 130 (e.g., electrochemical parameters of the battery 130, such as one or parameters identified in Table 1), and update a solid concentration model of the battery 130. The charge conservation component 106 can load or initialize a model for the battery 130. The charge conservation component 106 can retrieve the model for the solid diffusion from the model data structure or database stored in data repository 114. The charge conservation component 106 can retrieve, load or otherwise initialize parameters from profile information 116 for the battery 130 stored in data repository 114. In some cases, the charge conservation component 106 can pre-initialize or load the solid diffusion model for the battery 130, or any other parameters from profile 116, prior to receiving the value or time-dependent function of the current from the battery controller component 112. For example, the charge conservation component 106 can load one or more parameters and initialize the model responsive to the vehicle 122 being turned on, or some other event, trigger, or condition separate from receiving the value of the current of the battery 130.

The battery management system 102 can include, interface or otherwise access a reaction kinetics component 108. The reaction kinetics component 108 can receive the value of the current and profile information for the battery 130 (e.g., electrochemical parameters of the battery 130, such as one or parameters identified in Table 1). The reaction kinetics component 108 can load or initialize a model for the battery 130. The reaction kinetics component 108 can retrieve the model from the model data structure or database stored in data repository 114. The reaction kinetics component 108 can retrieve, load or otherwise initialize parameters from profile information 116 for the battery 130 stored in data repository 114. In some cases, the reaction kinetics component 108 can pre-initialize or load the model for the battery 130, or any other parameters from profile 116, prior to receiving the value or time-dependent function of the current from the battery controller component 112. For example, the reaction kinetics component 108 can load one or more parameters and initialize the model responsive to the vehicle 122 being turned on, or some other event, trigger, or condition separate from receiving the value of the current of the battery 130.

The charge conservation component 106 and reaction kinetics component 108 can determine, via the multi-particle model, the local current distribution that converges. For example, the charge conservation component 106 and reaction kinetics component 108, via ACTS 410-416, can determine the local current distribution that converges. The battery management system 102 can determine the local current distribution and the concentration distribution in an iterative process for each particle in the multi-particle model. The iterative process can refer to or include repeating acts 410-416 in process 400 depicted in FIG. 4. The iterative process can refer to or include iterating through one or more ACTS in process 400 for each particle.

The battery management system 102 can include, interface or otherwise access a mass conservation component 110. The mass conservation component 110 can receive the value of the current and profile information for the battery 130 (e.g., electrochemical parameters of the battery 130, such as one or parameters identified in Table 1). The mass conservation component 110 can load or initialize a model for the battery 130. The mass conservation component 110 can retrieve the model from the model data structure or database stored in data repository 114. The mass conservation component 110 can retrieve, load or otherwise initialize parameters from profile information 116 for the battery 130 stored in data repository 114. In some cases, the mass conservation component 110 can pre-initialize or load the model for the battery 130, or any other parameters from profile 116, prior to receiving the value or time-dependent function of the current from the battery controller component 112. For example, the mass conservation component 110 can load one or more parameters and initialize the model responsive to the vehicle 122 being turned on, or some other event, trigger, or condition separate from receiving the value of the current of the battery 130. The mass conservation component 110 can determine, via the multi-particle model and subsequent to determination of the local current distribution that converges, a concentration distribution (e.g., ACT 420 in process 400 depicted in FIG. 4). The mass conservation component 110 can determine a $Li^+$ concentration distribution using, for example, the new local current distribution, potential distribution, cell voltage, profile 116, or other information.

The battery management system 102 can include a battery controller component 112 designed, constructed, configured or operational to determine, predict, or estimate a value of a voltage of the battery 130 and a value of a heat generation rate of the battery 130. The battery controller component 112 can, for example, receive the output from one or more of components 106, 108 and 110 to determine the voltage, temperature, thermal power, or heat generation rate. The battery controller component 112 can receive the updated model from each of the components 106, 108 and 110. The battery controller component 112 can access the data repository 114 to retrieve the updated model. The battery controller component 112 can determine the voltage and heat generation rate based on the solid concentration model updated by the charge conservation component 106, the electrolyte concentration model updated by the reaction kinetics component 108, the electrolyte potential model updated by the mass conservation component 110, and the solid potential model updated by the mass conservation component 110.

The battery controller component 112 can determine, based on the local current distribution, a value of a voltage of the battery. The battery controller component 112 can determine the voltage of a cell of the battery 130. The battery controller component 112 can determine the voltage of one or more cells of the battery 130. The battery controller component 112 can determine, based on the value of the voltage of the battery and the Li$^+$ concentration distribution, a temperature of the battery. The battery controller component 112 can determine the temperature of the battery based on the concentration distribution and a thermal balance function. The battery controller component 112 can determine a thermal power of the battery based on the converged current distribution, Li$^+$ concentration distribution, cell voltage, material properties or profile 116 information. The battery controller component 112 can determine the temperature or heat generation rate based on the models updated by the components 106, 108 and 110. The battery controller component 112 can determine, subsequent to convergence of the local current distribution and determination of the Li$^+$ concentration distribution, the thermal power and then update the temperature of a cell of the battery 130.

The battery controller component 112 can determine, in real-time, the value of the voltage of the battery or the temperature of the battery based on the multi-particle model. Real-time can refer to determining the value of the voltage or the temperature of the battery responsive to receiving information of the electrical load or electrical characteristic (e.g., current) of a battery 130 of a vehicle 122 that is in-use. Real-time can refer to determine the value of the voltage or the temperature of the battery 130 in an online mode, such as for a vehicle 122 that receives power from the battery 130. Real-time can refer to or include within 20 minutes of receiving the current value, 15 minutes of receiving the current value, 10 minutes of receiving the current value, 5 minutes of receiving the current value or less.

The battery controller component 112 can generate, based on the value of the voltage of the battery or the temperature of the battery, a command to manage a performance of the battery. The command can include a notification, indication, instruction, control command, or other output based on the value of the voltage and the heat generation rate. The battery controller component 112 can generate the command with an instruction to reduce the value of the current output by the battery 130. The battery controller component 112 can generate the command with an indication of remaining battery power to display via a display device 128 of the vehicle 122. The battery controller component 1120 can terminate, responsive to the temperature being greater than a threshold, current output from one or more cells of the battery 130. The battery controller component 112 can terminate, responsive to the value of the temperature being greater than a threshold, charging of one or more cells of the battery 130.

For example, the battery controller component 112 can determine that the voltage is less than or equal to a predetermined threshold. Responsive to determining that the voltage is less than the predetermined threshold, the battery controller component 112 can generate an instruction, notification or other indication to charge the battery or an indication of remaining battery power to display via a display device of the vehicle. In another example, the battery controller component 112 can determine that the voltage is greater than or equal to a predetermined threshold. Responsive to determining that the voltage is greater than or equal to the predetermined threshold, the battery controller component 112 can generate a command, instructions, control or other indication to stop or terminate charging of the battery 130.

The battery controller component 112 can determine that the battery temperature, cell temperature or heat generation rate is greater than or equal to a predetermined threshold. Responsive to determining that the battery temperature, cell temperature or heat generation rate is greater than or equal to the predetermined threshold, the battery controller component 112 can generate a command, instructions, control or other indication to stop or terminate charging of the battery 130, or accessing power from the battery (or a battery cell of the battery). The battery controller component 112, responsive to a comparison of the voltage with a voltage threshold, or the battery temperature, cell temperature or heat generation rate with a temperature or heat generation rate threshold, can generate a command with an instruction to reduce the amount of current output by the battery 130. For example, the battery controller component 112 can terminate, responsive to the value of the battery temperature, cell temperature or heat generation rate being greater than or equal to the threshold, current output from one or more cells of the battery 130, thereby at least partially disabling the battery 130 in order to increase the longevity of the battery 130. The battery controller component 112 can terminate, responsive to the value of the battery temperature, cell temperature or heat generation rate being greater than or equal to the threshold, current input to one or more cells of the battery 130, thereby at least partially disabling or terminating charging of the battery 130 in order to increase the longevity of the battery 130.

The battery management system 102 (e.g., via controller component 112) can generate a command including an instruction to cause the onboard computing unit 124 of the vehicle 122 to execute an action such as displaying a notification via a display device 144 (e.g., vehicle dash, LCD, LED, or other electronic or digital visual display communicatively coupled to the onboard computing unit 124). For example, the visual output can include an alert, notification, warning, or suggestion to adjust, change, or terminate a function or aspect of the vehicle 122.

The battery management system 102 can generate the command in real-time responsive to receiving, measuring or detecting the value of the current. Generating the command in real-time can refer to generating the command within 1 minute, 2 minutes, 3 minutes, 4 minutes, 5 minutes, 6 minutes, or 10 minutes of detecting or determining the current output value of the battery 130. Generating the command in real-time can refer to generating a command indicative or responsive to the characteristic or performance of the battery 130 that is currently in use in the vehicle 122. Generating the command in real-time can refer to generating a command configured to improve a characteristic or behavior associated with the battery 130 or vehicle 122.

Figure 2:
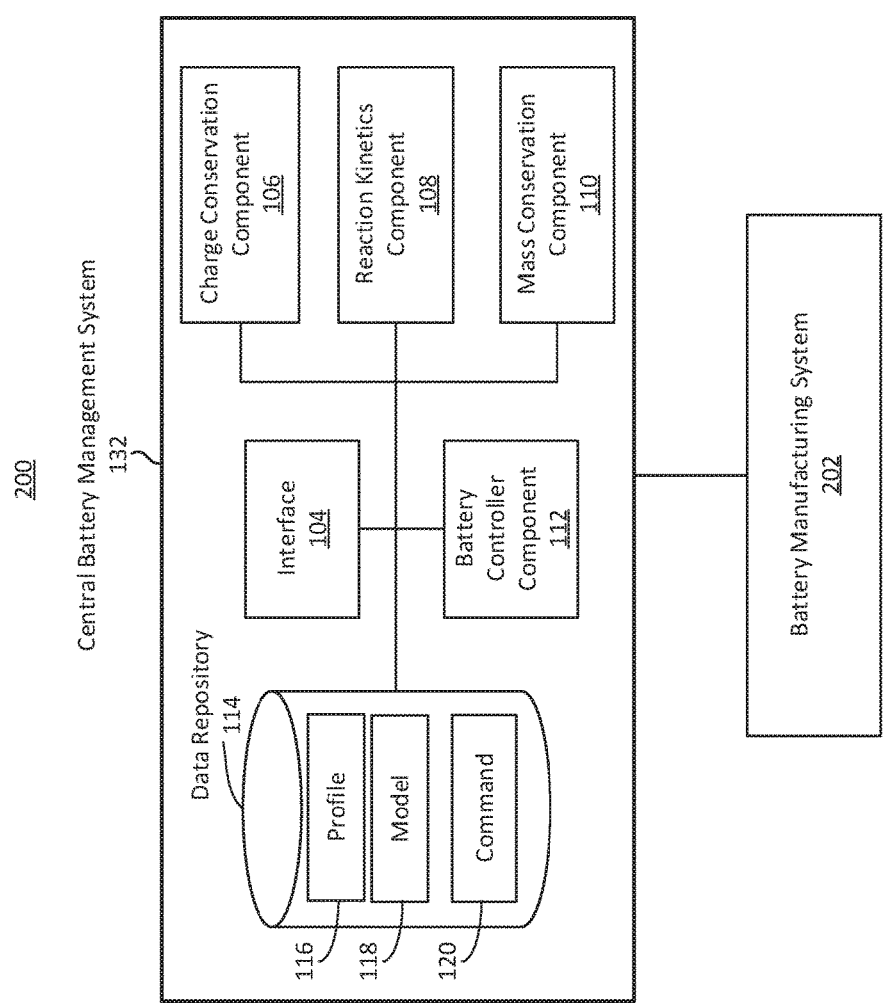
FIG. 2 depicts a block diagram depicting an example system to manage battery performance to facilitate manufacturing of a battery, in accordance with an implementation.

FIG. 2 depicts a block diagram depicting an example system to manage battery performance to facilitate manufacturing of a battery, in accordance with an implementation. The system 200 can include the central battery management system 132 depicted in FIG. 1. The system 200 can include a battery manufacturing system 202. The battery manufacturing system 202 can refer to or include components or processes related to designing aspects of a battery 130, manufacturing a battery 130, or testing a battery 130. The central battery management system 132 can be configured to simulate battery performance, such as simulate, for a given battery profile and input time-dependent current values, an output voltage of the battery and the heat generation rate of the voltage. The central battery management system 132 can run simulations of the battery performance based on models 118 and profile 116 information in order to test whether a battery having the profile 116 functions in a desired manner. The central battery management system 132 can output or provide for display a particle concentration profile and an electrolyte concentration profile of the battery 130 that is being tested or under simulation.

The central battery management system 132 can include on or more component or functionality of the battery management system 102. The central battery management system 132 can communicate with or receive or transmit data with the battery management system 102 via a network 101. The central battery management system 132 can be configured to run simulations on battery performance, and identify desired configurations for the battery 130. Upon identifying a desired configuration for the battery 130, or otherwise validating a battery configuration based on performance metrics such as heat generation rate and voltage levels, the central battery management system 132 can provide an indication of the validated or desired battery profile for use in a battery manufacturing system 202 (e.g., a battery design process).

Figure 3:
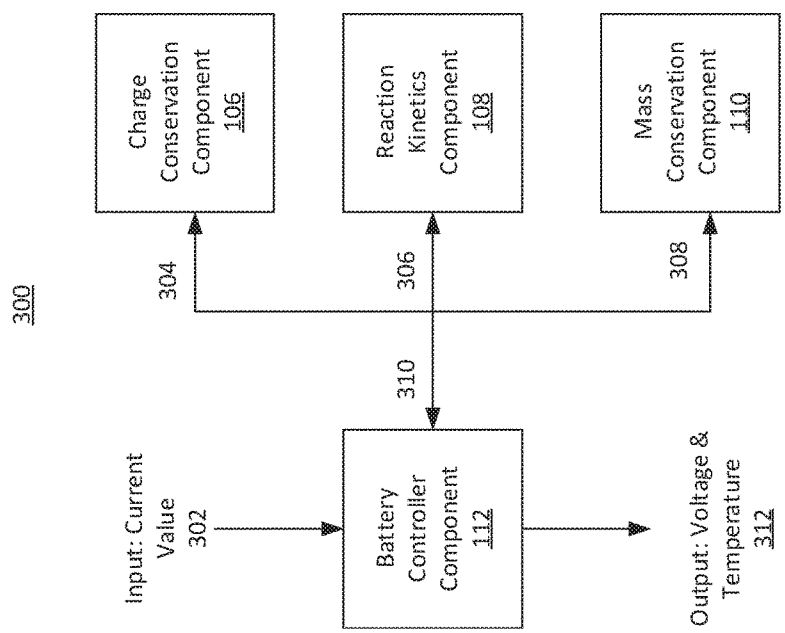
FIG. 3 depicts an example operational diagram of a system to manage battery performance of a vehicle, in accordance with an implementation.

FIG. 3 depicts an example operational diagram of a system to manage battery performance of a vehicle, in accordance with an implementation. The operation 300 can be performed by one or more system, component or function depicted in FIG. 1, FIG. 2 and FIG. 6. For example, the operation can be performed by or via a battery management system 102, battery controller component 112, mass conservation component 110, charge conservation component 106, or reaction kinetics component 108. At 302, the battery controller component 112 receives, as input, a current value. The battery controller component 112 can receive the current value as a time-dependent function. The current value can include a time series of current measurements. The current measurements can be real, physical measurements of the current being output by a battery of a vehicle, for example. The current measurements can be simulated current values from a computer simulation of a battery.

At 304, the battery controller component 112 can provide the current value as input to the charge conservation component 106. At 306, the battery controller component 112 can provide the current value as input to the reaction kinetics component 108. The battery controller component 112 can cause the charge conservation component 106 and reaction kinetics component 108 to execute simultaneously or in an overlapping manner in order reduce processing delay. At 308, the battery controller component 112 can provide the current value or other output to the mass conservation component 110. The battery controller component 112 can cause the mass conservation component 110 to execute subsequent to obtaining an output from the charge conservation component 106 and reaction kinetics component 108.

At 310, the battery controller component 112 can receive the output or updated model information from each of the components 106, 108 and 110. At 312, the battery controller component 112, using the updated model information, can output a voltage value, temperature, or a heat generation rate of the battery 130. The battery controller component 112 can further output commands, notifications, indications, or other information based on the voltage and heat generation rate.

Figure 5:
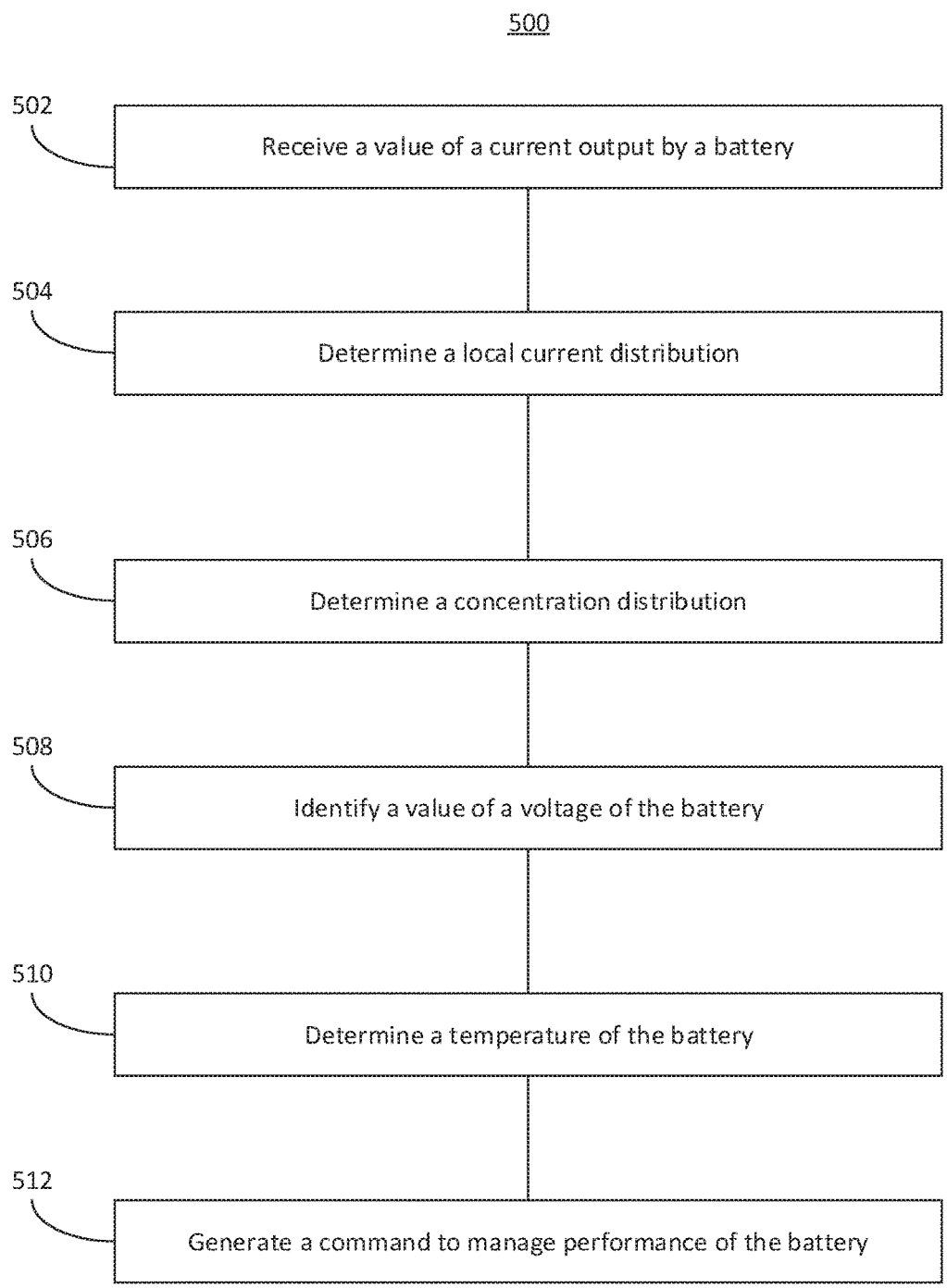
FIG. 5 depicts an example of a method of managing battery performance of a vehicle, in accordance with an implementation.

FIG. 5 depicts an example method of managing battery performance of a vehicle. The method 500 can be performed using one or more system or component depicted in FIGS. 1-3 and 6. For example, the method 500 can be performed by a BMS 102, vehicle 122, or central battery management system 132.

The technical solution provided by the method 500 can include providing an online battery management system using a more accurate and reliable multi-particle model. The method 500 solves the technical problem of multi-particle models being computationally intense, thereby preventing them from being used in online battery management systems, such as in a vehicle. Further, using a reduced order model may be inaccurate for high charge rates (e.g., discharge in 1 hour). The reduced order model can be inaccurate for greater than 1 C-rate (e.g., charge or discharge rate). The C-rate can indicate the charge and discharge rates of a battery. A C-rate of 1 C is can refer to a one-hour to fully discharge a battery; 0.5 C or C/2 is a two-hour discharge and 0.2 C or C/5 is a 5-hour discharge. The reduced order model may be inaccurate for determining the voltage of a cell of the battery or temperature of the battery at c-rates greater than or equal to 1 C.

Therefore, the method 500 can use a multi-particle model where the charge conservation and reaction kinetics components are determined first in an iterative or non-iterative manner. Subsequently, the method 500 can determine the mass conservation components for the electrode and electrolyte. Upon determining the mass conservation component, the method 500 can use a thermal balance function to determine the temperature. Since these components are solved sequentially, the method 500 can solve for each particle in the multi-particle model. The multi-particle model can include, for example, 3 particles, 4 particles, 5 particles, 6 particles, 7 particles, 10 particles, 15 particles or more.

At 502, a BMS can receive a value of a current output by a battery. The BMS can receive a value of a current output by a battery of a vehicle that supplies power to the vehicle. The value of the current output by the battery corresponding to a first timestamp. The BMS can receive the value based on a time interval, periodically, or responsive to a request instruction or command. For example, the BMS can receive a request for a voltage level or temperature of the battery. Responsive to the request, the BMS can request the value of the current output by the battery. The BMS can receive current values for an individual cell of the battery. The BMS can receive the current values for one or more cells or the entire battery.

At 504, the BMS can determine a local current distribution. The BMS can determine, via a multi-particle model, a local current distribution that converges. The BMS can determine the local current distribution using a numerical method. The BMS can iterate through multiple steps until the current distribution converges or is consistent. Convergence or consistence of the current distribution can refer to when the difference or a delta between subsequent determinations of the local current distribution is less than or equal to an error threshold. The BMS can determine the local current distribution by initially using a constant average local current distribution to determine a potential distribution, and then determining the new local current distribution. The BMS can determine the potential distribution in an electrolyte, a positive electrode and a negative electrode of a cell of the battery. The BMS can update the local current distribution based on the potential distribution and a Butler-Volmer reaction kinetic equation.

At 506, the BMS can determine a concentration distribution. The BMS can determine, via the multi-particle model and subsequent to determination of the local current distribution that converges, a concentration distribution. The concentration distribution can refer to a $Li^+$ concentration distribution.

At 508, the BMS can identify a value of a voltage of the battery. The BMS can identify or determine, based on the local current distribution that has converged, a value of a voltage of the battery. At 510, the BMS can determine a temperature of the battery. The BMS can determine the temperature of the battery (or a cell thereof) based on the value of the voltage of the battery and the concentration distribution.

At 512, the BMS can generate a command to manage performance of the battery. The BMS can generate a command to manage the performance of the battery based on the value of the voltage of the battery or the temperature of the battery. The BMS can generate the command based on a comparison of the voltage or the temperature with a threshold. The command can cause the vehicle to adjust an amount of power generated or consumed from the battery so as to manage a performance of the battery. The performance of the battery can refer to an instantaneous available power or state-of-power, a temperature of the battery, a heat generation rate of the battery, a longevity of the battery, a remaining capacity of the battery. For example, the BMS can generate the command with an instruction to reduce the value of the current output by the battery, an indication of remaining battery power to display via a display device of the vehicle, or terminate or disable current output from one or more cells of the battery.

Figure 6:
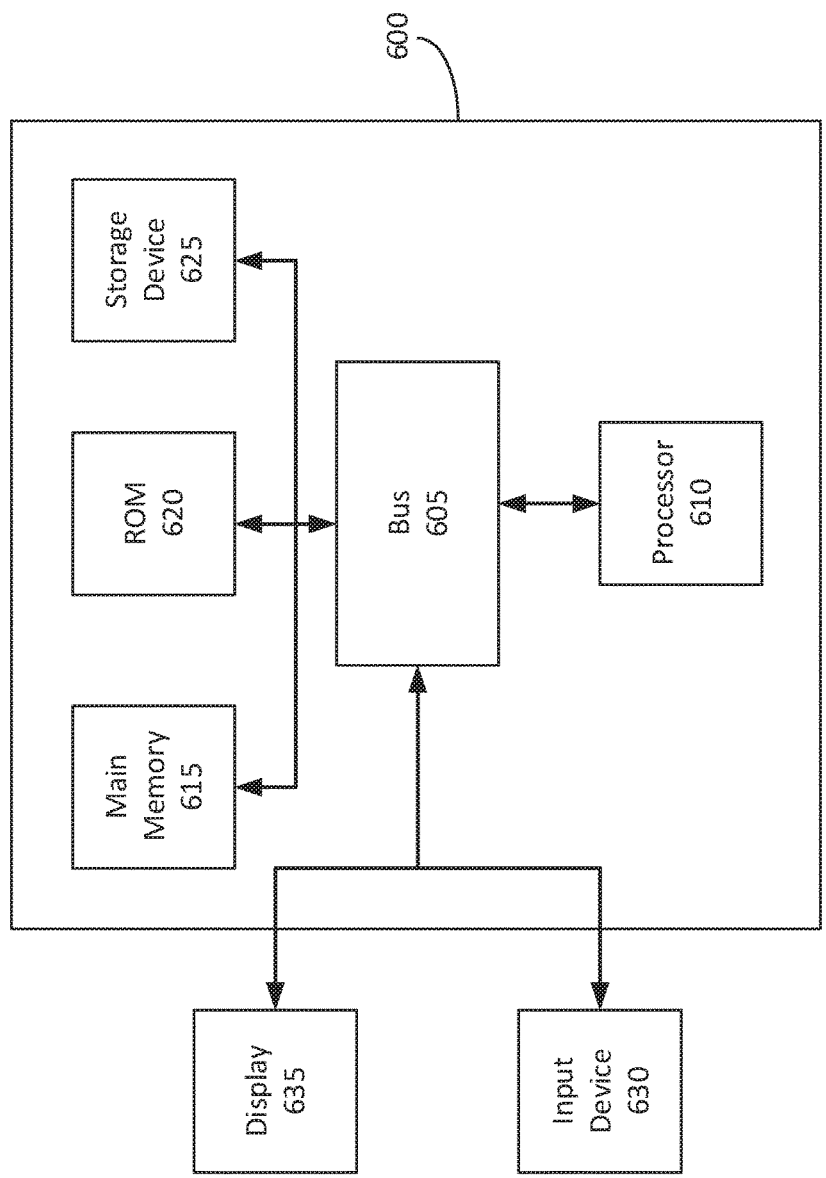
FIG. 6 is a block diagram illustrating an architecture for a computer system that can be employed to implement elements of the systems and methods described and illustrated herein, including, for example, the system depicted in FIGS. 1 and 2, operations depicted in FIG. 3, process depicted in FIG. 4, and the method depicted in FIG. 5.

FIG. 6 is a block diagram of an example computer system 600. The computer system or computing device 600 can include or be used to implement the battery management system 102, or its components such as the battery management system 102. The computing system 600 includes at least one bus 605 or other communication component for communicating information and at least one processor 610 or processing circuit coupled to the bus 605 for processing information. The computing system 600 can also include one or more processors 610 or processing circuits coupled to the bus for processing information. The computing system 600 also includes at least one main memory 615, such as a random access memory (RAM) or other dynamic storage device, coupled to the bus 605 for storing information, and instructions to be executed by the processor 610. The main memory 615 can also be used for storing position information, vehicle information, command instructions, vehicle status information, environmental information within or external to the vehicle, road status or road condition information, or other information during execution of instructions by the processor 610. The computing system 600 may further include at least one read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions.

The computing system 600 may be coupled via the bus 605 to a display 635, such as a liquid crystal display, or active matrix display, for displaying information to a user such as a driver of the vehicle 122. An input device 630, such as a keyboard or voice interface may be coupled to the bus 605 for communicating information and commands to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 (e.g., on a vehicle dashboard) can be part of the battery management system 102, the sensor 126, or other component of FIG. 1, as well as part of the vehicle 122, for example.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components (e.g., arbitration component), and the positioning component 105 and map data illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Systems and methods described herein may be embodied in other specific forms without departing from the characteristics thereof. For example, descriptions of positive and negative electrical characteristics (e.g., polarities) may be reversed. Elements described as negative elements can instead be configured as positive elements and elements described as positive elements can instead by configured as negative elements. The battery cells (e.g., batteries 130) can provide power to electric vehicles (including hybrids) as well as other machines that are not electric vehicles, such as unmanned robotic or other devices, including devices that are not transport vehicles. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system to manage battery performance of a vehicle, comprising:
    a battery management system of the vehicle comprising one or more processors and memory;
    a database of the battery management system that stores a profile for a battery of the vehicle;
    a sensor of the vehicle to identify a value of a current output by the battery that supplies power to the vehicle, the value of the current output by the battery corresponding to a first timestamp;
    the battery management system to determine, via a multi-particle model, a local current distribution that converges;
    the battery management system to determine, via the multi-particle model and subsequent to determination of the local current distribution that converges, a concentration distribution of lithium ions;
    a battery controller component of the battery management system to:
        determine, based on the local current distribution determined from the multi-particle model, a value of a voltage of the battery;
        determine, based on the value of the voltage of the battery and the concentration distribution of lithium ions determined from the multi-particle model, a temperature of the battery; and
        generate, based on the value of the voltage of the battery or the temperature of the battery determined based on the multi-particle model, a command to manage a performance of the battery.

2. The system of claim 1, further comprising:
    the battery controller component to generate the command comprising an instruction to reduce the value of the current output by the battery.

3. The system of claim 1, further comprising:
    the battery controller component to generate the command comprising an indication of remaining battery power to display via a display device of the vehicle.

4. The system of claim 1, further comprising:
    the battery controller component to terminate, responsive to the temperature of the battery being greater than a threshold, current output from one or more cells of the battery.

5. The system of claim 1, further comprising:
    the battery controller component to terminate, responsive to the temperature of the battery being greater than a threshold, charging of one or more cells of the battery.

6. The system of claim 1, further comprising:
the battery controller component to determine, in real-time, the value of the voltage of the battery or the temperature of the battery based on the multi-particle model.

7. The system of claim 1, further comprising:
the battery management system to determine the local current distribution and the concentration distribution of lithium ions in an iterative process for each particle in the multi-particle model.

8. The system of claim 1, further comprising the battery management system to:
determine, subsequent to convergence of the local current distribution and determination of the concentration distribution of lithium ions, a thermal power; and
update the temperature of a cell of the battery.

9. The system of claim 1, further comprising the battery management system to:
determine the local current distribution based on a Butler-Volmer reaction kinetic equation.

10. The system of claim 1, further comprising the battery management system to:
determine, based on the local current distribution, a potential distribution in an electrolyte and an electrode of a cell of the battery;
update, based on the potential distribution and a Butler-Volmer reaction kinetic equation, the local current distribution.

11. The system of claim 1, further comprising the battery management system to:
identify a constant average local current distribution in a positive electrode and a negative electrode of a cell of the battery;
determine, based on the constant average local current distribution, a potential distribution in an electrolyte, the positive electrode and the negative electrode of the cell of the battery;
determine, based on the potential distribution and a Butler-Volmer reaction kinetic equation, the local current distribution;
update, based on the local current distribution, the potential distribution in the electrolyte, the positive electrode and the negative electrode of the cell of the battery; and
update, based on the updated potential distribution and the Butler-Volmer reaction kinetic equation, the local current distribution.

12. The system of claim 11, further comprising the battery management system to:
iteratively update the local current distribution until the local current distribution converges.

13. The system of claim 1, further comprising the battery management system to:
identify a second value of the current output corresponding to a second timestamp;
determine the local current distribution that converges based on the second value of the current output corresponding to the second timestamp;
determine, via the multi-particle model and subsequent to determination of the local current distribution that converges based on the second value of the current output corresponding to the second timestamp, the concentration distribution of lithium ions for the second timestamp;
determine a second value of the voltage of the battery for the second timestamp;
determine, based on the second value of the voltage of the battery and the concentration distribution of lithium ions for the second timestamp, a second temperature of the battery for the second timestamp; and
generate, based on the second value of the voltage of the battery or the second temperature of the battery, a second command to manage the performance of the battery.

14. A method of managing battery performance of a vehicle, comprising:
receiving, by a battery management system of the vehicle comprising one or more processors and memory, a value of a current output by a battery of the vehicle that supplies power to the vehicle, the value of the current output by the battery corresponding to a first timestamp;
determining, by the battery management system, via a multi-particle model, a local current distribution that converges;
determining, by the battery management system, via the multi-particle model and subsequent to determination of the local current distribution that converges, a concentration distribution of lithium ions;
identifying, by the battery management system, based on the local current distribution determined from the multi-particle model, a value of a voltage of the battery;
determining, by the battery management system, based on the value of the voltage of the battery and the concentration distribution of lithium ions determined from the multi-particle model, a temperature of the battery; and
generating, by the battery management system, based on the value of the voltage of the battery or the temperature of the battery determined based on the multi-particle model, a command to manage a performance of the battery.

15. The method of claim 14, further comprising:
generating the command comprising an instruction to reduce the value of the current output by the battery.

16. The method of claim 14, further comprising:
generating the command comprising an indication of remaining battery power to display via a display device of the vehicle.

17. The method of claim 14, further comprising:
terminating, responsive to the temperature of the battery being greater than a threshold, current output from one or more cells of the battery.

18. The method of claim 14, further comprising:
determining the local current distribution and the concentration distribution of lithium ions in an iterative process for each particle in the multi-particle model.

19. The method of claim 14, further comprising:
determining, based on the local current distribution, a potential distribution in an electrolyte and an electrode of a cell of the battery;
updating, based on the potential distribution and a Butler-Volmer reaction kinetic equation, the local current distribution.

* * * * *